Patented Nov. 14, 1939

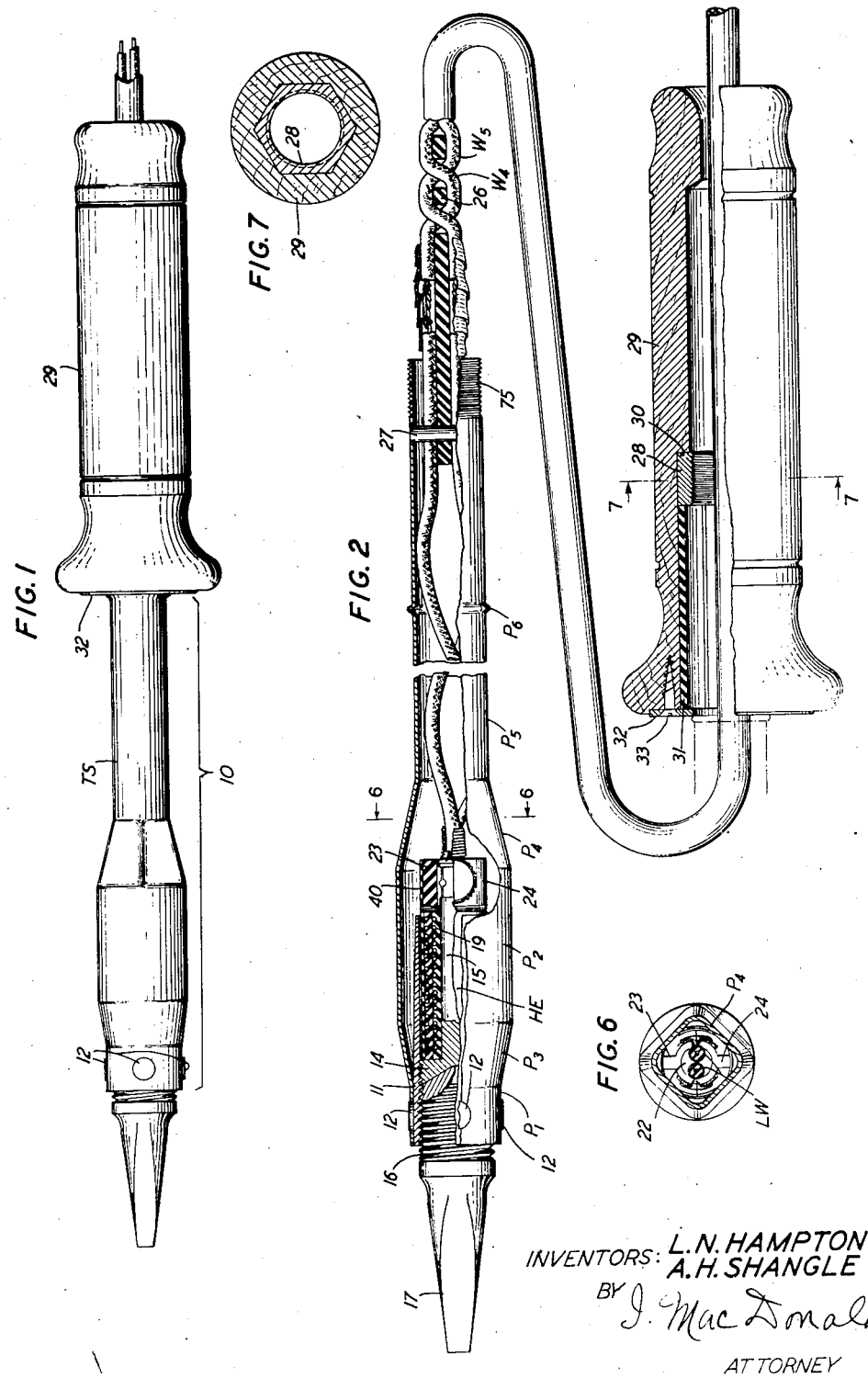
Nov. 14, 1939. L. N. HAMPTON ET AL 2,179,818
ELECTRICALLY HEATED TOOL
Filed March 10, 1937 2 Sheets-Sheet 1
INVENTORS: L. N. HAMPTON
A. H. SHANGLE
BY J. MacDonald
ATTORNEY

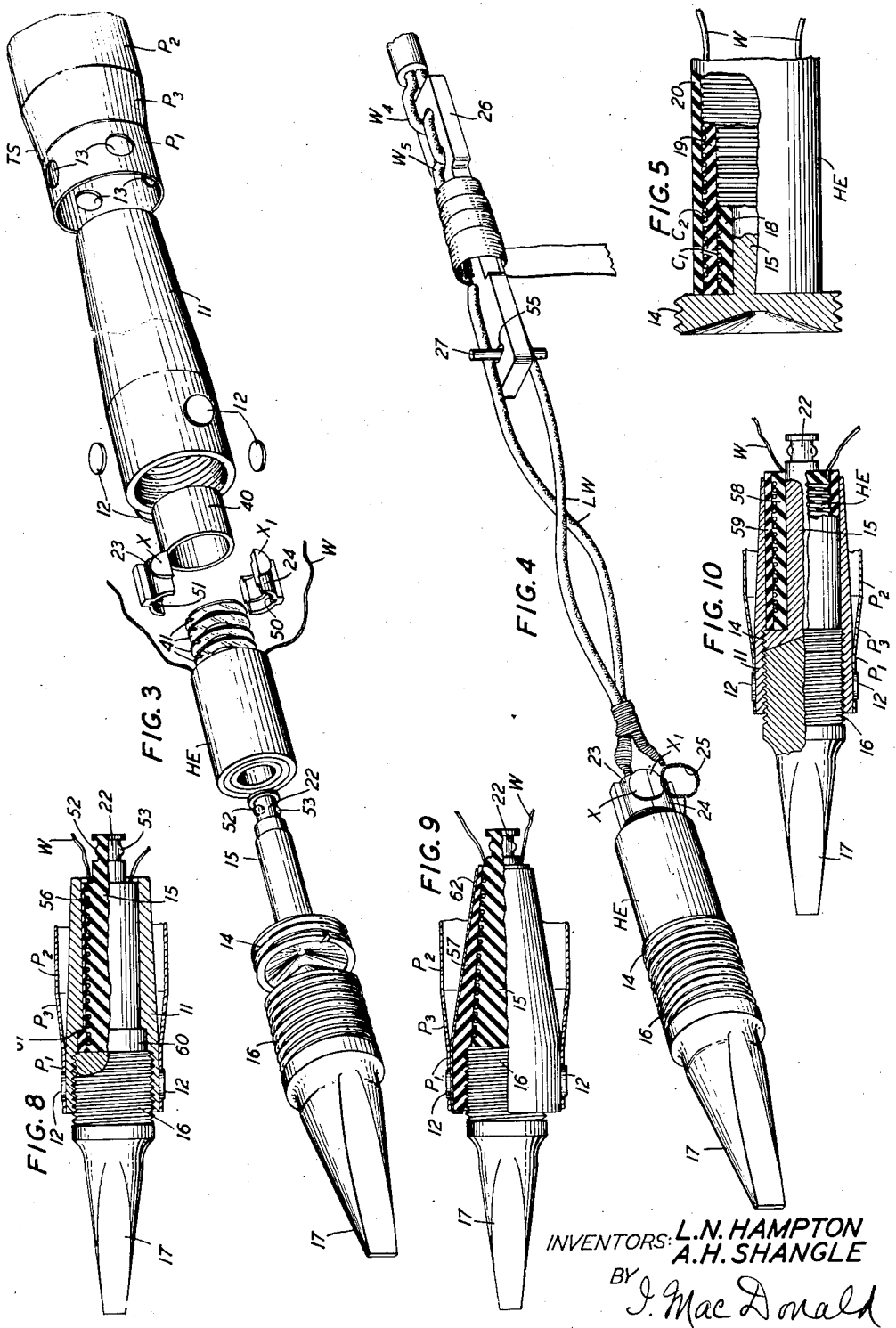

2,179,818

UNITED STATES PATENT OFFICE 2,179,818

ELECTRICALLY HEATED TOOL

Leon N. Hampton, New York, N. Y., and Amos H. Shangle, Roselle, N. J., assignors to Bell Telephone Laboratories, Incorporated, New York, N. Y., a corporation of New York Application March 10, 1937, Serial No. 130,022

4 Claims. (Cl. 219—26)

This invention relates to electrically heated tools and more particularly to that class of tools known as soldering coppers.

It is an improvement over the electrically heated tools disclosed in Patent 1,994,994 to L. N. Hampton dated March 19, 1935. In the tool covered in that patent a considerable amount of semiprecious metal is used for the operating parts in order to obtain a good thermal path to the heat applying member and for preventing the destructive effect of oxidation on these parts. While an efficient soldering tool was obtained through the use of semiprecious metal for its operating parts, the manufacturing cost of such a tool was found too high for the general use of this tool.

The object of this invention is to improve the construction and efficiency of such a tool while reducing its maintenance and manufacturing cost.

This is accomplished by providing a heating element in which the core is made of base metal such as an alloy containing copper, zinc and tin which is free from oxidation and scaling. This core is screw-threaded at one end for engaging an associated bushing also of a non-oxidizing and non-scaling material, this bushing being disposed in concentric relation with a tubular support of non-oxidizing material and of low thermal conductivity such as chrome-nickel steel and is securely held thereto by a plurality of key members engaging holes in the support and welded to the bushing, this construction providing means for taking care of the difference in the coefficient of expansion between the tubular support and to the bushing without loosening or damaging them. Means is provided in the bushing for receiving the heat applying member in end-to-end abutting relation with the threaded portion of the core, the other end of the core extending in concentric relation with the bushing which thus serves for housing the resistance winding which is embedded in molded insulating material having good dielectric and heat conductivity characteristics. Means engaging the core is provided for attaching the terminals of the winding to lead-in wires which are covered with asbestos sleeving or wrapped asbestos insulation to a point in the handle for connection with a standard cord on a terminal block.

In the device of the invention, due to the complete use of different base metals which are free from oxidation and scaling, a cheap and durable soldering tool is obtained. While the use of one base metal which has been found to possess good thermal conductivity, for a number of its different operating parts, and the use of another base metal, which has been found to possess low thermal conductivity for others of its operating parts, a highly efficient soldering copper is obtained.

Other novel features of the invention and advantages will appear from the following description and by the claims appended thereto, reference being had to the accompanying drawings in which:

Fig. 1 is an assembly view;

Fig. 2 is a longitudinal sectional view, the handle being removed from its tubular support;

Fig. 3 is an exploded view;

Fig. 4 is a partial view shown in perspective;

Fig. 5 is a view of the heater element partly in section;

Fig. 6 is a cross-sectional view taken on line 6—6 of Fig. 2;

Fig. 7 is a cross-sectional view taken on line 7—7 of Fig. 2; and

Figs. 8, 9 and 10 are modifications of the heater element shown in Fig. 5.

According to the soldering tool of the invention, a tubular support TS is made of a metal having low thermal conductivity consisting of an alloy 18 per cent chromium, 8 per cent nickel and 74 per cent iron.

This tubular support is formed at one end with a cylindrical portion P1, an enlarged portion P2 including a conical portion P3, the portion P4 of square cross-section as shown in Fig. 6 and the cylindrical portion P5 which is formed with a ridge P6, the end of this cylindrical portion being peripherally screw-threaded as shown in Fig. 2 for a purpose that will be hereinafter described in detail.

A bushing 11 shown in Figs. 2, 3, 8 and 10 is fitted in the cylindrical portion P1 of tubular support TS by a press-fit engagement and is securely held against rotary movement therein by a plurality of disc members 12 shown in Figs. 1, 2 and 3 engaging similarly sized holes 13 in the cylindrical portion P1 of the support and electrically welded on to the bushing 11, this construction permitting the radial expansion of the portion P1 of the tubular support relative to the bushing without loosening it from the support.

The bushing 11 is made of an alloy containing 58 per cent copper, 40 per cent zinc and 2 per cent tin, such alloy being substantially free from objectionable oxidation and scaling.

The bushing 11 forms with the enlarged portion P2 of the tubular support an annular airpath provided for heat insulating the support from this bushing and is interiorly screw-threaded at its front end for engagement with the peripherally screw-threaded portion 14 of a core 15 and the peripherally screw-threaded portion 16 of a heat applying tip 17. The core 15 and the heat applying tip 17 are made of an alloy consisting of 58 per cent copper, 40 per cent zinc and 2 per cent tin.

On the core portion 15 is fitted a heater element HE shown in Figs. 2, 3, 4 and 5. This heater element consists of three sleeves, 18, 19 and 20, each made of a cement containing approximately 50 per cent powdered silicon, 50 per cent powdered zircon with diluted phosphoric acid as a binder. These sleeves after being formed by means of suitable molds and dried are baked at a temperature of approximately 1200° F. and on the sleeve 18 is wound the resistance wire W to form the coil C1 (Fig. 5). The wire W thus coiled and the exposed portion of the sleeve 18 are then covered with a coat of this cement in a liquid form and the sleeve 19 placed in concentric relation on the sleeve 18 when the wire W is wound on the sleeve 19 to form the coil C2. The wire W and the exposed portions of sleeve 19 are also coated with liquid cement and the sleeve 20 slipped over the sleeve 19, with both ends of wire W extending now from one end of the heater unit HE thus formed. The core 15 which in this type of heater element is preferably made of an alloy consisting of 58 per cent copper, 40 per cent zinc and 2 per cent tin, is coated with liquid cement as used for the cementing of the sleeves 18, 19 and 20 and inserted into the sleeve 18 as shown in Figs. 2, 4 and 5 to form with the sleeves 18, 19 and 20 and the coils C1 and C2 a solid block or mass, this construction resulting in a very efficient unit for the heat applying tip 17 possessing relatively high thermal conductivity and high dielectric characteristics.

The core 15 as shown in Fig. 3 and in the modifications shown in Figs. 8, 9 and 10 is provided with a recessed portion 22 for receiving two similar segmentally-shaped wire connecting pieces 23 and 24 shown in exploded view in Fig. 3 and in assembled relation in Figs. 2 and 4. Each of the segmental portions 23 and 24 is provided with a keyway 50 and 51 for engaging key portions 52 and 53 formed at the end of core portion 15 for preventing the turning movement of segmental portions 23 and 24 relative to the core. Each of the segmental portions 23 and 24 is provided with a pair of diametrically opposite semicircular-shaped portions X and X1 made of an extruded material consisting of alumina, silica and magnesia which when in assembled relation as shown in Fig. 4 form two diametrically opposite circular projections around which the loops, as 25, which are formed during assembly at the ends of lead-in wires LW engage as shown in Fig. 2, and to these loops are attached the ends of the resistance wire W so that a pull on the wire LW will be resisted by the loops 25 and the breaking of the resistance wire W is effectively prevented, these loops being formed around the semicircular portions X, X1 for holding the wire connecting pieces 23 and 24 in assembled relation on the core portion 22 and a sleeve 40 of insulating material shown in Figs. 2 and 3 and a plurality of mica washers 41 are disposed between the ends of the heater element HE and the segmental wire connecting pieces 23 and 24 for insulating them.

The wires LW are covered with asbestos sleeving and extend for connection with the cord wires W4 and W5 interlacing a strip 26 of insulating material, as, for example, vulcanized fibre, the strip 26 being securely held against any pulling action by a pin 27 engaging diametrically opposite holes in the tubular support TS and through a hole 55 in the insulating piece 26 as shown in Fig. 4.

The end of cylindrical portion 75 of the tubular support is peripherally screw-threaded for engagement with a similarly interiorly screw-threaded hexagonal nut 28 shown in Figs. 2 and 7 in the handle 29, this nut being held against the shoulder portion 30 by a sleeve 31 and a plate 32, the latter being held in a recess in the front end of handle 29 by a plurality of wood screws 33.

In the modification of the heater element, as shown in Fig. 8, the resistance wire W which is made of an alloy containing aluminum and cobalt is wound on the core 15 and the sleeve 56 formed with an enlarged portion 60 is cemented over the resistance wire with its collar portion 60 abutting against a shoulder portion 61 formed in the bushing 11 and the other end of core 15 is formed integrally with the reduced portion 22 and the keys 52 and 53, the sleeve 56 being also cemented into the bushing 11 to form a good heat-conducting path toward the heat applying tip 17.

In the modification shown in Fig. 9, the resistance wire W is wound on a core portion 15 and over the wire W is placed a sleeve 57 which is cemented on to the core 15 and into a metallic sleeve 62 to which the disc members are soldered.

In the modification shown in Fig. 10, the resistance wire W is wound on a sleeve 58 which is united to the core 15 and the bushings 59 and 11 by a liquid cement, in the manner described in connection with the heater elements shown in Figs. 5 and 8, thus forming an uninterrupted heat path from the heat generating point of the element thus formed to the heat applying tip and a very efficient soldering tool is obtained.

What is claimed is:

1. An electrically heated soldering tool comprising a tubular support, a bushing mounted in said support in concentric relation therewith, means for securing said bushing in said support, said means comprising a plurality of key members engaging holes in said support and welded to said bushing, a core and a heat-applying tip engaging said bushing in end-to-end abutting relation therein and a heater element cemented to said core and said bushing to form a block of heat-conducting material for heating said tip.

2. An electrically heated soldering tool comprising a tubular support, a bushing made of a substantially non-oxidizing non-scaling material disposed concentrically to said support, a heat applying member threadedly engaging said bushing, a heating element cemented to said bushing, a core for said heating element having an enlarged portion threadedly engaging said bushing in end-to-end abutting relation to said heat applying member and cemented to said heating element, and a handle carried by said support, said bushing, said core and said cement being heat treated to form a block of good heat-conducting material from said heating element to said heat-applying member.

3. In a soldering copper, a tubular support formed with a cylindrical portion at one of its ends, a conical portion contiguous to said cylindrical portion, a bulging portion, a portion having a square cross-section, another cylindrical portion, a circular ridge formed with the last-mentioned portion, and a screw-threaded portion at the other end of said tubular support, a bushing engaging the first-mentioned cylindrical portion to form with said bulging portion a circular air chamber, a plurality of disc-shaped key members welded to said bushing and loosely engaging means in said support for securing said bushing, a heat applying member threadedly engaging said bushing, a heater element threadedly engaging said bushing to form a stop for said member, the tightening action of said heat-applying member against said element being effective to force said heat-applying member and said element in firm contact with said bushing to form a plurality of conducting paths toward said heat-applying member and a handle having means for engaging the threaded portion of said support in abutting relation with said ridge.

4. In an electrically heated soldering copper, a tubular support, a heater element carried by said support, said element consisting of a core and a plurality of concentrically disposed bushings mounted on said core and united to each other and to said core by a binder, a resistor wire embedded in said binder and the whole heat-treated to integrate said core, said wire, said bushings and said binder to form a solid block of heat-conducting material, and a heat-applying member threadedly engaging one of said bushings in abutting relation with said core.

LEON N. HAMPTON.
AMOS H. SHANGLE.